United States Patent
Nishisaka et al.

(10) Patent No.: US 9,633,793 B2
(45) Date of Patent: Apr. 25, 2017

(54) MULTILAYER CERAMIC CAPACITOR

(71) Applicant: Murata Manufacturing Co., Ltd., Nagaokakyo-shi, Kyoto-fu (JP)

(72) Inventors: Yasuhiro Nishisaka, Nagaokakyo (JP); Yoshito Saito, Nagaokakyo (JP); Makoto Ogawa, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 48 days.

(21) Appl. No.: 14/844,346

(22) Filed: Sep. 3, 2015

(65) Prior Publication Data

US 2016/0071647 A1  Mar. 10, 2016

(30) Foreign Application Priority Data

Sep. 9, 2014 (JP) .................................. 2014-182893
Jul. 30, 2015 (JP) .................................. 2015-150917

(51) Int. Cl.
*H01G 4/30* (2006.01)
*H01G 4/008* (2006.01)
*H01G 4/232* (2006.01)
*H01G 4/12* (2006.01)

(52) U.S. Cl.
CPC ............. *H01G 4/30* (2013.01); *H01G 4/0085* (2013.01); *H01G 4/2325* (2013.01); *H01G 4/12* (2013.01)

(58) Field of Classification Search
CPC .......... H01G 4/30; H01G 4/228; H01G 4/232; H01G 4/2325; H01G 4/248; H01G 4/252
See application file for complete search history.

(56) References Cited

U.S. PATENT DOCUMENTS

| 8,988,851 | B1* | 3/2015 | Sawada | H01G 4/232 361/301.4 |
|---|---|---|---|---|
| 2007/0128794 | A1* | 6/2007 | Kusano | H01G 4/2325 438/253 |
| 2009/0195960 | A1* | 8/2009 | Sato | B82Y 30/00 361/301.4 |
| 2010/0302704 | A1* | 12/2010 | Ogawa | H01G 4/30 361/306.3 |
| 2011/0205686 | A1* | 8/2011 | Yamaguchi | C04B 35/4682 361/321.4 |
| 2013/0208401 | A1 | 8/2013 | Shirakawa et al. | |
| 2013/0258546 | A1* | 10/2013 | Kim | H01G 4/12 361/301.4 |

FOREIGN PATENT DOCUMENTS

| JP | H64-080011 A | 3/1989 |
|---|---|---|
| JP | 2002270458 A | 9/2002 |
| JP | 2013165180 A | 8/2013 |

* cited by examiner

*Primary Examiner* — Dion R Ferguson
(74) *Attorney, Agent, or Firm* — Arent Fox LLP

(57) ABSTRACT

A multilayer ceramic capacitor that contains at least one kind of a first element that forms a covalent hydride with hydrogen (except for an element generating a hydride having a boiling point of less than 125° C.) and a second element that forms a hydride in a boundary region with hydrogen between an outermost plating layer constituting an external electrode and a dielectric layer constituting a ceramic element body.

17 Claims, 7 Drawing Sheets

MULTILAYER CERAMIC CAPACITOR

BACKGROUND OF THE INVENTION

Field of the Invention

The present invention relates to a multilayer ceramic capacitor, and particularly to a structure of an external electrode and an internal electrode of the multilayer ceramic capacitor.

Description of the Background Art

A multilayer ceramic capacitor includes a ceramic element body constituted of a plurality of layered dielectric layers, a plurality of internal electrodes arranged between the dielectric layers respectively, and a pair of external electrodes formed on the ceramic element body to be conductively connected to the internal electrodes. Ni-plating is applied to surfaces of the external electrodes to prevent dissolution into solder at the time of mounting. Further, Sn-plating is applied onto Ni-plating films to improve soldering performance at the time of mounting with soldering. The plating with Ni and Sn is typically formed by an electroplating method.

Japanese Patent Laying-Open No. 1-80011 discloses that a chemical reaction in a plating step generates hydrogen ion, and the hydrogen ion is occluded into an internal electrode and gradually reduces a dielectric layer in a periphery to cause a problem such as deterioration of an insulation resistance. It also discloses that, when an internal electrode having a noble metal (for example, Ag—Pd alloy) as a main component is used, the solution for the problem is to add metal (for example, Ni), which inactivates absorption of hydrogen, to the internal electrode.

SUMMARY OF THE INVENTION

However, in recent years, base metal such as Ni rather than noble metal such as Ag or Pd is often used as the material for an internal electrode to reduce the material costs. Moreover, although Japanese Patent Laying-Open No. 1-80011 discloses that Ni is "metal which inactivates absorption of hydrogen," it has been found according to the studies conducted by the inventors that even the use of Ni for an internal electrode may lead to deterioration of an insulation resistance due to an influence of hydrogen.

The present invention solves the above-described problems, and its object is to provide a multilayer ceramic capacitor capable of reducing the influence of hydrogen generated in the plating step and preventing deterioration of the insulation resistance.

As described above, it has been conventionally considered that hydrogen generated in the plating step had an influence on deterioration of the insulation resistance. The inventors conducted studies on deterioration of the insulation resistance described above, and obtained the knowledge that much of hydrogen generated in the plating step is once occluded into an external electrode or an internal electrode and is diffused to reach a dielectric layer when addition of temperature or application of voltage is made with respect to a multilayer ceramic capacitor. The inventors conducted further experiments and analysis based on the knowledge to accomplish the present invention.

A multilayer ceramic capacitor in accordance with a first aspect of the present invention includes a ceramic element body, a plurality of internal electrodes, and a pair of external electrodes. The ceramic element body includes a plurality of layered dielectric layers and has opposite end surfaces opposing each other and a plurality of side surfaces connecting the opposite end surfaces. The plurality of internal electrodes contain base metal as a main component, are arranged between the layered dielectric layers, and are alternately drawn out to the opposite end surfaces. Each of the pair of external electrodes has an external electrode main body formed on the ceramic element body to be conductively connected to the internal electrodes which are drawn out to the opposite end surfaces of the ceramic element body, and at least one plating layer formed on an outer side of the external electrode main body. In the multilayer ceramic capacitor in accordance with the first aspect of the present invention, at least one kind of an element forming a covalent hydride with hydrogen (however, except for an element generating hydride having a boiling point of less than 125° C.) and an element forming a hydride in a boundary region with hydrogen is contained between an outermost plating layer among the plating layers and the dielectric layers.

In the description above, the element forming a covalent hydride with hydrogen (however, except for an element generating hydride having a boiling point of less than 125° C.) is an element which belongs to a boron group (except for In and Tl), a carbon group, a nitrogen group, an oxygen group, and halogen in a long-form periodic table. Moreover, the element forming a hydride in a boundary region with hydrogen is an element which is at a boundary between an element forming a covalent hydride with hydrogen and an element forming metal-like hydride with hydrogen and belongs to a boron group (except for Al and Ga), Group 11, and Group 12 in a long-form periodic table.

Moreover, the matter which is present between the outermost plating layer and the dielectric layer certainly includes the internal electrode and the external electrode main body. If a conductor is formed between the outermost plating layer and the external electrode main body, at an interface between the external electrode main body and the internal electrode, or at an interface between the internal electrode and the dielectric layer, it is also included.

Moreover, the element may be present as a single element between the outermost plating layer and the dielectric layer, or may be coupled to other element present between the outermost plating layer and the dielectric layer. Moreover, the hydrogen may include hydrogen in any state, such as a hydrogen atom, hydrogen ion, a hydrogen molecule, a hydrogen isotope, and the like. The hydrogen herein is hydrogen generated mainly by electrolysis in the plating step. Other than that, hydrogen present as water generated by plating liquid or condensation, or as vapor in atmospheric air is also included.

Here, in the multilayer ceramic capacitor in accordance with the first aspect of the present invention, when the element is contained in the external electrode main body, diffusion of hydrogen from the external electrode main body can be suppressed by allowing the external electrode main body to hold hydrogen.

Moreover, in the multilayer ceramic capacitor in accordance with the first aspect of the present invention, when the element is contained in the internal electrode, diffusion of hydrogen from the internal electrode to the dielectric layer can be suppressed by allowing the internal electrode to hold hydrogen.

A multilayer ceramic capacitor in accordance with a second aspect of the present invention includes a ceramic element body, a plurality of internal electrodes, and a pair of external electrodes. The ceramic element body includes a plurality of layered dielectric layers and has opposite end surfaces opposing each other and a plurality of side surfaces connecting the opposite end surfaces. The plurality of internal electrodes contain base metal as a main component, are arranged between the layered dielectric layers, and are alternately drawn out to the opposite end surfaces. Each of the pair of external electrodes has an external electrode main body formed on the ceramic element body to be conductively connected to the internal electrodes drawn out to the opposite end surfaces of the ceramic element body and at least one plating layer formed on an outer side of the external electrode main body. The multilayer ceramic capacitor in accordance with the second aspect of the present invention further includes a hydrogen-holding film containing at least one kind of an element forming a covalent hydride with hydrogen (however, except for an element generating hydride having a boiling point of less than 125° C.) and an element forming a hydride in a boundary region with hydrogen at an interface between the internal electrode and the external electrode main body, on an outer surface of the external electrode main body, in the external electrode main body, at an interface between the internal electrode and the dielectric layer, and at an interface between an outermost plating layer and an inner plating layer in a case where the plating layer includes a plurality of layers.

The hydrogen-holding film in the description above may be formed continuously, or may be present partially, or in a form such as a meshed form, a liner form, or the like.

Here, in the multilayer ceramic capacitors in accordance with the first and second aspects of the present invention, the element is preferably of at least one kind selected from the group consisting of Sn, Bi, Al, Ag, Zn, Au, In, Ga, Ge, and Si.

After Sn, Bi, Al, Ag, Zn, Au, In, Ga, Ge, or Si is coupled with hydrogen, the hydrogen is held, so that diffusion of hydrogen to the dielectric layer can be suppressed.

It should be noted that, since Sn, Bi, and Al among those elements have a low melting point and readily form alloy, they are particularly preferable elements.

The multilayer ceramic capacitor in accordance with the first aspect of the present invention contains, between the outermost plating layer and the dielectric layer, at least one kind of an element forming a covalent hydride with hydrogen (however, except for an element generating hydride having a boiling point of less than 125° C.) and an element forming a hydride in a boundary region with hydrogen. Therefore, hydrogen generated in the plating step can be held between the outermost plating layer and the dielectric layer. Accordingly, diffusion of hydrogen to the dielectric layer can be suppressed, so that deterioration of an insulation resistance (IR) can be prevented.

Moreover, the multilayer ceramic capacitor in accordance with the second aspect of the present invention includes a hydrogen-holding film containing at least one kind of an element forming a covalent hydride with hydrogen (however, except for an element generating hydride having a boiling point of less than 125° C.) and an element forming a hydride in a boundary region with hydrogen at an interface between the internal electrode and the external electrode main body, on an outer surface of the external electrode main body, in the external electrode main body, at an interface between the internal electrode and the dielectric layer, and at an interface between an outermost plating layer and an inner plating layer in case where the plating layer includes a plurality of layers. Therefore, hydrogen is held by the hydrogen-holding film, so that diffusion of hydrogen to the dielectric layer can be suppressed.

It should be noted that the hydrogen-holding film should be arranged at one of the interface between the internal electrode and the dielectric layer, the interface between the internal electrode and the external electrode main body, the surface outside of the external electrode main body, inside the external electrode main body, the interface between the internal electrode and the dielectric layer, and the interface between the outermost plating layer and the inner plating layer in the case where the plating layer is formed of a plurality of layers. However, the configuration having the hydrogen-holding film provided at two or more locations is also possible.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

First Embodiment

Figure 1:
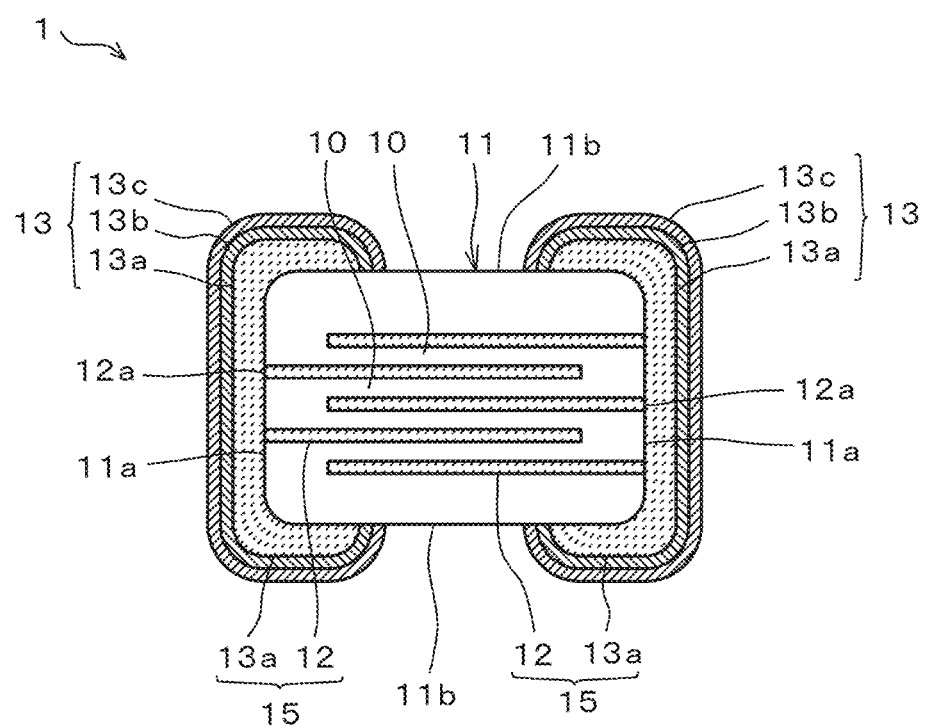
FIG. 1 is a cross-sectional view representing a multilayer ceramic capacitor in accordance with a first embodiment of the present invention.

Referring to FIG. 1, a multilayer ceramic capacitor 1 in accordance with a first embodiment of the present invention will be described. Multilayer ceramic capacitor 1 includes a ceramic element body 11, a plurality of internal electrodes 12, and a pair of external electrodes 13. Ceramic element body 11 includes a plurality of layered dielectric layers 10, and has opposite end surfaces 11a opposing each other and a plurality of side surfaces 11b connecting opposite end surfaces 11a. The plurality of internal electrodes 12 are arranged between layered dielectric layers 10 respectively and alternately drawn out to opposite end surfaces 11a of ceramic element body 11. The pair of external electrodes 13 are formed to be conductively connected to internal electrodes 12.

Ceramic element body 11 has an approximately rectangular solid shape including opposite end surfaces 11a and four side surfaces 11b, and corner portions and ridge portions are beveled and have a circular shape. As material constituting dielectric layer 10, $BaTiO_3$-based dielectric ceramic is used. Other than that, as material constituting dielectric layer 10, dielectric ceramic having $CaTiO_3$, $SrTiO_3$, $CaZrO_3$, or the like as a main component can be used.

Internal electrodes 12 are formed so as to be alternately exposed to opposite end surfaces 11a of ceramic element body 11. As conductive material constituting internal electrodes 12, material having Ni as a main component is used. Other than that, as conductive material constituting internal electrodes 12, base metal having Cu as a main component can be used.

External electrodes 13 are formed on opposite end surfaces 11a of ceramic element body 11, and have external electrode main bodies 13a formed to be conductively connected to internal electrodes 12, and plating layers 13b, 13c formed on outer sides of external electrode main bodies 13a. External electrode main bodies 13a are formed by applying conductive paste containing metal powder and glass to end surfaces 11a of ceramic element body 11 and firing the same. As material constituting external electrode main bodies 13a, metal having Cu as a main component is used. Other than that, as material constituting electrode main bodies 13a, conductive material having Ni or the like as a main component can be used. The thickness of each external electrode main body 13a of Ni is, for example, 1 to 100 μm.

Plating layers 13b, 13c are constituted of plating layers 13b formed on outer surfaces of external electrode main bodies 13a and outermost plating layers 13c formed on outer surfaces of plating layers 13b. Ni is used as material constituting plating layers 13b, and Sn is used as material constituting plating layers 13c. Other than that, metal such as Pd, Cu, Au, or the like can be used as outermost plating layers 13c. The respective thicknesses of plating layers 13b, 13c are, for example, 0.1 to 20 μm. Plating layers 13b, 13c are formed by an electroplating method. It should be noted that the plating layers are not always necessary to be constituted of a plurality of layers, and may be constituted of a single layer of metal such as Cu.

In multilayer ceramic capacitor 1 of the present embodiment, at least one kind of an element forming a covalent hydride with hydrogen (however, except for an element generating hydride having a boiling point of less than 125° C.) and an element forming a hydride in a boundary region with hydrogen (hydrogen-holding element) is contained in conductive path bodies 15 connecting plating layers 13b on the surfaces of external electrode main bodies 13a and dielectric layers 10.

Particularly, in the multilayer ceramic capacitor of this embodiment, a hydrogen-holding element is contained in external electrode main bodies 13a constituting a part of conductive path bodies 15 described above.

It should be noted that conductive path bodies 15 are conductive paths formed between plating layers 13b on the surfaces of external electrode main bodies 13a and dielectric layers 10 and include internal electrodes 12 and external electrode main bodies 13a. Further, when another conductor is formed at an interface between plating layers 13b and external electrode main bodies 13a, at an interface between external electrode main bodies 13a and internal electrodes 12, or at an interface between internal electrodes 12 and dielectric layers 10, it is also included.

Moreover, the element forming a covalent hydride with hydrogen (however, except for an element generating hydride having a boiling point of less than 125° C.) is an element which belongs to a boron group (B, Al, Ga except for In, Tl), a carbon group (C, Si, Ge, Sn, Pb), a nitrogen group (N, P, As, Sb, Bi), an oxygen group (O, S, Se, Te, Po), and halogen (F, Cl, Br, I, At) in the long-form periodic table.

Moreover, the element forming a hydride in a boundary region with hydrogen is an element which is at a boundary between an element forming a covalent hydride with hydrogen and an element forming metal-like hydride with hydrogen and belongs to a boron group (In and Tl except for Al and Ga), Group 11 (Cu, Ag, Au), and Group 12 (Zn, Cd, Hg) in the long-form periodic table to form a compound with hydrogen. These elements form a stable compound with hydrogen. In other words, these elements have a property that, once being coupled with hydrogen, energy is required to separate the hydrogen so that hydrogen is less likely to be emitted. Utilizing this property, hydrogen generated in the plating step can be held in the conductive path bodies 15 described above.

In this embodiment, in order to allow external electrode main bodies 13a constituting a part of conductive path bodies 15 to contain the hydrogen-holding element, powder of the hydrogen-holding element in the metal state (hydrogen-holding metal powder) is blended in the conductive paste at the time of forming external electrode main bodies 13a. A ratio of the hydrogen-holding metal powder blended in the conductive paste is preferably 1 to 40 vol % in a solid content ratio.

It should be noted that the hydrogen-holding metal may be present as a single metal in external electrode main bodies 13a, or may be dispersed with other metal in external electrode main bodies 13a or alloyed in some cases.

Here, a cross section of multilayer ceramic capacitor 1 having Sn added as the hydrogen-holding element is observed with the FE-WDX method (field-emission wavelength-dispersive X-ray spectrometry).

Figure 3:
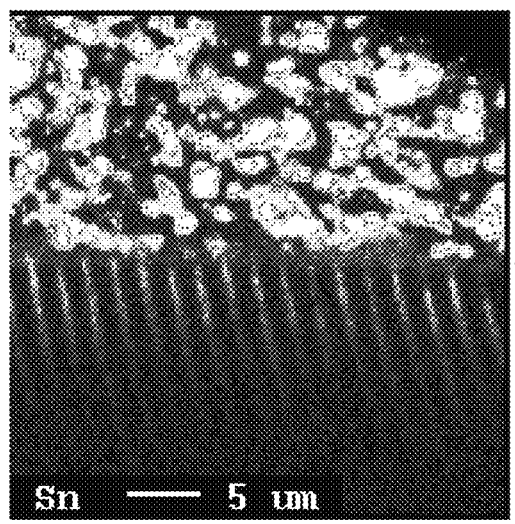
FIG. 3 is a mapping diagram of Sn obtained by analyzing a cross section of the multilayer ceramic capacitor in accordance with the first embodiment of the present invention by means of an FE-WDX method (Field-Emission Wavelength-Dispersive X-ray spectrometry).

FIG. 3 is a mapping diagram of Sn (hydrogen-holding metal) obtained by analyzing a cross section of multilayer ceramic capacitor 1, which has external electrode main bodies 13a formed with use of conductive paste having Sn added as hydrogen-holding metal and containing Cu as a main component, by means of the FE-WDX method.

The sample for analysis was produced by polishing multilayer ceramic capacitor 1 until the volume thereof is reduced to about one half along end surfaces 11a of ceramic element body 11 and in the direction orthogonal to the uppermost layer of dielectric layers 10 and thereafter milling the polishing sag of the internal electrodes. Then, the sample produced in the manner described above was analyzed under the following conditions by means of the FE-WDX method.

Acceleration Voltage: 15.0 kV
Illumination Current: $5 \times 10^{-8}$ A
Magnification: 3000 magnification
Dwell Time (time for capturing at one pixel): 40 ms
Analysis Depth: 1 to 2 μm As a result, as shown in FIG. 3, it was confirmed that Sn was present in external electrode main body 13a and also present partially in drawn-out portions 12a of internal electrodes 12 which are drawn out to end surfaces 11a of ceramic element body 11.

<Evaluation Test>

In order to confirm significance of multilayer ceramic capacitor 1 of this embodiment, samples of sample numbers 1 to 5 in Table 1 were produced with use of conductive paste prepared by adding different kinds of metal powders (Sn, Bi, Ag, Pd) shown in Table 1 to conductive paste having Cu powder as a conductive component and with use of conductive paste having no metal powder added.

It should be noted that the detailed specification of the conductive paste was set as follows.

Amount of Solid Content: 25 vol %
Ratio of Cu Powder in Solid Content: 70 vol %

Ratio of Glass in Solid Content: 25 vol %
Ratio of Added Metal Powder in Solid Content: 5 vol %
Particle Diameter of Cu Powder: 3 μm
Particle Diameter of Glass: 2 μm
Composition of Glass: BaO—SrO—$B_2O_3$—$SiO_2$-based glass frit (glass with glass frit containing BaO: 10 to 50 weight %, $B_2O_3$:3 to 30 weight %, and $SiO_2$:3 to 30% in terms of oxide was used)

When producing the samples of sample numbers 1 to 5, this conductive paste was applied to end surfaces 11a of ceramic element body 11 and fired to form external electrode main bodies 13a.

After that, plating layers 13b of Ni were formed on outer sides of external electrode main bodies 13a by electroplating, and plating layers 13c of Sn were further formed on outer sides thereof by electroplating.

In such a manner, the samples of sample numbers 1 to 5 in Table 1 were obtained.

The produced multilayer ceramic capacitors generally have a capacity of 10 μF, a rated voltage of 6.3V, dimensions with a length of 1.0 mm, a width of 0.5 mm, a height of 0.5 mm, external electrode main body 13a with a thickness of 25 μm (a central portion of the end surface), plating layer 13b with a thickness of 3 μm, and plating layer 13c with a thickness of 3 μm.

Then, the PCBT test was conducted for the samples of sample numbers 1 to 5 in Table 1 produced in such a manner.

The PCBT test was conducted under the conditions with a temperature of 125° C., a relative humidity of 95%, an applied voltage of 3.2V, and a loading time of 72 hrs. Then, an insulation resistance (IR) was measured for each sample. In terms of Log IR, the case where an IR value at the time of terminating the test is lowered from the IR value at the time of starting the test by 0.5 is taken as the IR deterioration. It should be noted that the number of samples for each was twenty.

The results are shown in Table 1.

TABLE 1

| Sample Number | Added Metal Powder | IR Deterioration Number n = 20 |
|---|---|---|
| 1 | Sn | 0 |
| 2 | Bi | 0 |
| 3 | Ag | 3 |
| *4 | Pd | 14 |
| *5 | none | 6 |

The samples having * on the sample numbers are samples which are out of the scope of the present invention.

In Table 1, the samples of the sample numbers 1 to 3 are samples satisfying the requirements of the present invention, and the samples of the sample numbers 4 and 5 are samples not satisfying the requirements of the present invention.

As shown in Table 1, occurrence of the IR deterioration could not be confirmed in the sample of the sample number 1 having external electrode main bodies 13a containing Sn and in the sample of the sample number 2 having external electrode main bodies 13a containing Bi. Moreover, few occurrence of the IR deterioration could be confirmed in the sample of the sample number 3 having external electrode main bodies 13a containing Ag.

On the other hand, much occurrence of the IR deterioration could be confirmed in the sample of the sample number 4 having external electrode main bodies 13a containing Pd and in the sample of the sample number 5 having no metal added.

As described above, since multilayer ceramic capacitor 1 of this embodiment have external electrode main bodies 13a containing the hydrogen-holding element, hydrogen generated in the plating step can be absorbed and held at external electrode main bodies 13a constituting a part of conductive path bodies 15. Consequently, diffusion of hydrogen to dielectric layers 10 is suppressed, so that deterioration of the insulation resistance (IR) can be prevented.

It should be noted that, according to the present invention, a favorable result can be obtained also in the case where the hydrogen-holding element such as Sn is present inside of internal electrodes 12. Moreover, a favorable result can be obtained also in the case where Bi or Al is present in place of Sn described above.

Moreover, according to the present invention, it is typically preferable that much of at least one kind of Sn, Bi, Al as the hydrogen-holding element are segregated at the joining portions of internal electrodes 12 and external electrode main bodies 13a.

Herein, the above-described joining portions of internal electrodes 12 and external electrode main bodies 13a will be described with reference to FIG. 2. The joining portion of internal electrode 12 and external electrode main body 13a is referred to as an intermediate point R0 between one end portion R1 (an upper end portion in FIG. 2) and the other end portion R2 (a lower end portion in FIG. 2) in a region R where end surface 12a of internal electrode 12 exposed to end surface 11a of ceramic element body 11 and external electrode main body 13a formed at end surface 11a of ceramic element body 11 are in contact with each other.

Figure 2:
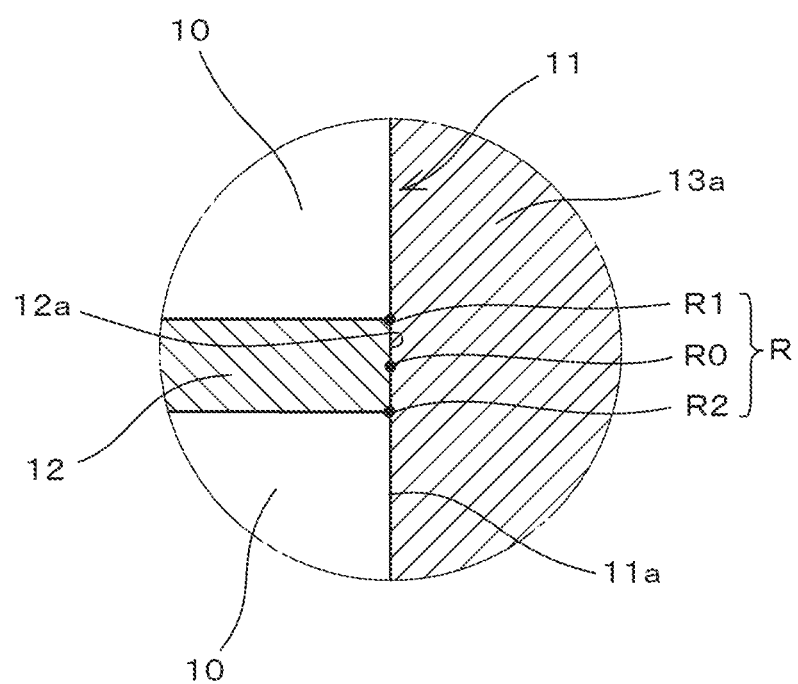
FIG. 2 is a drawing for illustrating a joining portion of an internal electrode and an external electrode main body of the multilayer ceramic capacitor in accordance with the first embodiment of the present invention.

In other words, the description "much of at least one kind of Sn, Bi, Al are segregated at the joining portions of internal electrodes 12 and external electrode main bodies 13a" above means that much of at least one kind of Sn, Bi, and Al are segregated at the position indicated by R0 in FIG. 2 (joining portion).

It should be noted that, although this embodiment describes the case where external electrode main body 13a has a single layer structure, it may be so configured that external electrode main body 13a is a multilayer structure and that a predetermined one layer or alternatively a plurality of layers among those layers contains the hydrogen-holding element.

Second Embodiment

Figure 4:
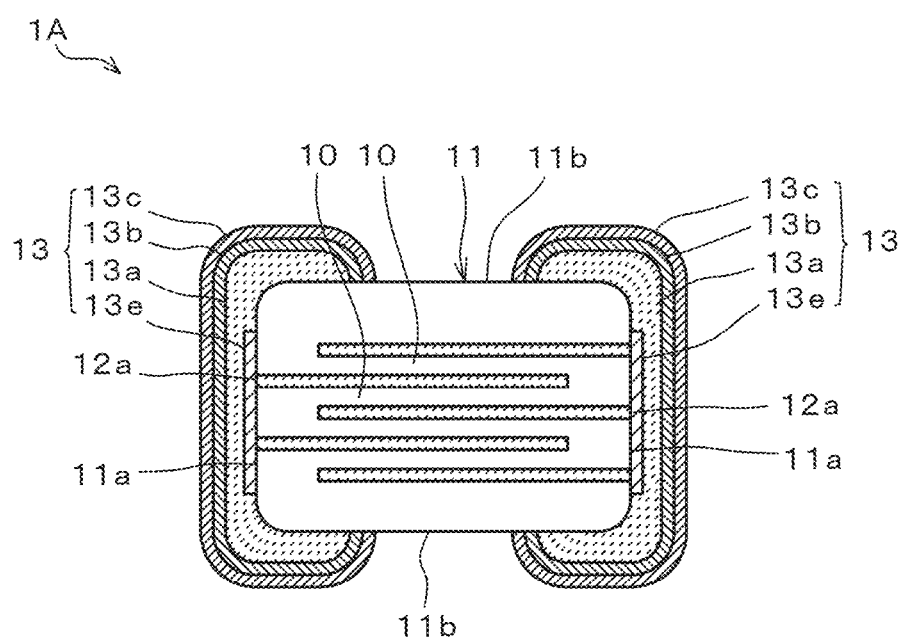
FIG. 4 is a cross-sectional view representing a multilayer ceramic capacitor in accordance with a second embodiment of the present invention.

Referring to FIG. 4, a multilayer ceramic capacitor 1A in accordance with a second embodiment of the present invention will be described. In this multilayer ceramic capacitor 1A, as shown in FIG. 4, hydrogen-holding films 13e are formed at interfaces between external electrode main bodies 13a and internal electrodes 12. It should be noted that the configurations which are common with those of multilayer ceramic capacitor 1 of the first embodiment have the same reference numerals allotted in the drawing illustrating multilayer ceramic capacitor 1A of the second embodiment, and description thereof will not be repeated. This similarly applies to the following third to fifth embodiments.

Multilayer ceramic capacitor 1A includes hydrogen-holding films 13e containing at least one kind of an element forming a covalent hydride with hydrogen (however, except for an element generating hydride having a boiling point of less than 125° C.) and an element forming a hydride in a boundary region with hydrogen at interfaces between external electrode main bodies 13a and internal electrodes 12. This hydrogen-holding films 13e are formed continuously on end surfaces 11a of ceramic element body 11 so as to cover drawn-out portions 12a of the internal electrodes exposed to end surfaces 11a. However, hydrogen-holding films 13e are not always necessary to be continuous, and it may be present partially, or in a form such as a meshed form, a liner form, or the like.

Hydrogen-holding films 13e are formed by spattering a hydrogen-holding element (hydrogen-holding metal) in a metal state, and it is formed in a state of a metal film on end surfaces 11a of ceramic element body 11. It should be noted that hydrogen-holding films 13e can be formed also by vapor deposition, plating, or the like.

<Evaluation Test>

In order to confirm significance of multilayer ceramic capacitor 1A of this embodiment, samples including films formed by spattering different kinds of metals (Sn, Bi, Al, Ag, Zn, Pd, Ti), in other words, samples of sample numbers 6 to 12 in Table 2 were produced. Moreover, a sample of the sample number 13 having no spattering applied and no hydrogen-holding film formed thereon was produced. The film thickness of hydrogen-holding film 13e was 1 μm.

It should be noted that the thickness of external electrode main body 13a was 15 μm (end surface central portion). As to the specification of conductive paste for forming external electrode main bodies 13a, the solid content amount was 25 vol %, and the ratio of glass in the solid content was 25 vol %.

For the samples of the sample numbers 6 to 13 in Table 2 produced in such a manner, the test was conducted under the same condition as the condition of the PCBT test conducted in the first embodiment described above.

The results are shown in Table 2.

TABLE 2

| Sample Number | Spattered Metal | IR Deterioration Number n = 20 |
| --- | --- | --- |
| 6 | Sn | 0 |
| 7 | Bi | 0 |
| 8 | Al | 0 |
| 9 | Ag | 3 |
| 10 | Zn | 2 |
| *11 | Pd | 14 |
| *12 | Ti | 12 |
| *13 | none | 10 |

The samples having * on the sample numbers are samples which are out of the scope of the present invention.

In Table 2, the samples of the sample numbers 6 to 10 are samples satisfying the requirements of the present invention, and the samples of the sample numbers 11 to 13 are samples not satisfying the requirements of the present invention.

As shown in Table 2, occurrence of the IR deterioration could not be confirmed in the sample of the sample number 6 provided with an Sn film as hydrogen-holding film 13e, the sample of the sample number 7 provided with a Bi film as hydrogen-holding film 13e, and the sample of the sample number 8 provided with an Al film as hydrogen-holding film 13e. Moreover, a few occurrence of the IR deterioration could be confirmed in the sample of the sample number 9 provided with an Ag film as hydrogen-holding film 13e and the sample of the sample number 10 provided with a Zn film as hydrogen-holding film 13e.

On the other hand, much occurrence of the IR deterioration could be confirmed in the sample of the sample number 11 having a Pd film formed by spattering and the sample of the sample number 12 having a Ti film formed. Much IR deterioration could be confirmed in the sample of sample number 13 having no spattering applied.

According to the result described above, since hydrogen generated in the plating step is absorbed by hydrogen-holding films 13e also in the case where hydrogen-holding films 13e are provided at interfaces between external electrode main bodies 13a and internal electrodes 12, diffusion of hydrogen to dielectric layer 10 through internal electrodes 12 can be suppressed and prevented.

In this second embodiment, while the example was described in which case hydrogen-holding films 13e are continuously formed on end surfaces 11a of ceramic element body 11 so as to entirely cover drawn-out portions 12a of the internal electrodes, the significant effect can be obtained also in the case where hydrogen-holding films 13e are present partially, or in a form such as a meshed form, a liner form, or the like on end surfaces 11a.

Third Embodiment

Figure 5:
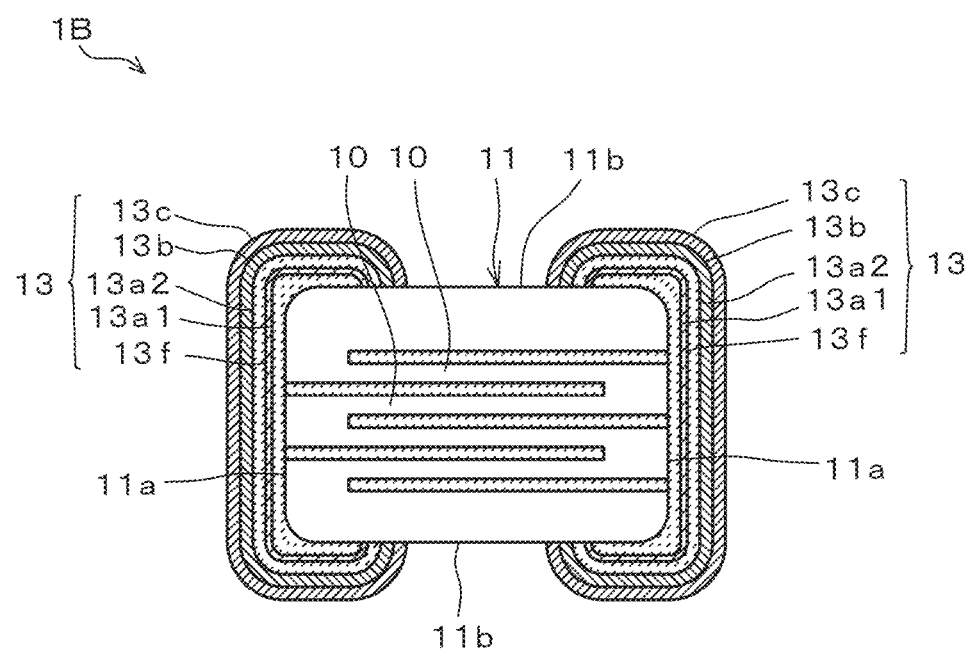
FIG. 5 is a cross-sectional view representing a multilayer ceramic capacitor in accordance with a third embodiment of the present invention.

FIG. 5 represents a multilayer ceramic capacitor 1B in accordance with a third embodiment of the present invention. In this multilayer ceramic capacitor 1B, hydrogen-holding films 13f are formed in external electrode main bodies 13a. Specifically, external electrode main body 13a is constituted of two layers including an external electrode main body 13a1 having Ni as a main component and an external electrode main body 13a2 having Cu as a main component, and hydrogen-holding film 13f having a conductivity and being substantially continuous is formed at an interface of the two layers.

Hydrogen-holding film 13f is formed by blending hydrogen-holding metal into conductive paste for forming external electrode main body 13a2 as the second layer and applying the conductive paste to external electrode main body 13a1 as the first layer, and thereafter concurrently firing the two layers including external electrode main bodies 13a1, 13a2.

A ratio of hydrogen-holding metal added to the conductive paste is preferably within the range of 1 to 40 vol %.

<Evaluation Test>

In order to confirm the significance of multilayer ceramic capacitor 1B of this embodiment, samples of the sample numbers 14 to 19 in Table 3 were produced with use of conductive paste prepared by adding different kinds of metal powders (Sn, Bi, Ag, Zn, Pd) shown in Table 3 to conductive paste having Cu powder as a conductive component and conductive paste having no metal powder added.

It should be noted that the amount of metal powder added to conductive paste for forming external electrode main body 13a2 as the second layer was set to have a ratio of 5 vol % as a solid content ratio in the conductive paste. Other specifications are set to be the same as the first embodiment.

On the other hand, the specification of the conductive paste for forming external electrode main body 13a1 as the first layer was set as follows.

Amount of Solid Content: 15 vol %

Ratio of Ceramic Material in Solid Content: 40 vol %

Ratio of Glass in Solid Content: 25 vol %

Particle Diameter of Ni Powder: 0.5 μm

Particle Diameter of Ceramic Material: 100 nm to 500 nm

For the samples of the sample numbers 14 to 19 in Table 3 produced in such a manner, the test was conducted under the same condition as that of the PCBT test conducted in the above-described first embodiment.

The results are shown in Table 3.

TABLE 3

| Sample Number | Added Metal Powder | IR Deterioration Number n = 20 |
|---|---|---|
| 14 | Sn | 0 |
| 15 | Bi | 0 |
| 16 | Ag | 1 |
| 17 | Zn | 1 |
| *18 | Pd | 5 |
| *19 | none | 4 |

The samples having * on the sample numbers are samples which are out of the scope of the present invention.

In Table 3, the samples of the sample numbers 14 to 17 are samples satisfying the requirements of the present invention, and the samples of the sample numbers 18 and 19 are samples not satisfying the requirements of the present invention.

As shown in Table 3, occurrence of the IR deterioration could not be confirmed in the sample of the sample number 14 having Sn blended into external electrode main body 13a2 as the second layer and the sample of the sample number 15 having Bi blended. Moreover, there was a few occurrence of IR deterioration in the sample of the sample number 16 having Ag blended and the sample of the sample number 17 having Zn blended.

On the other hand, much IR deterioration has occurred in the sample of the sample number 18 having Pd blended in external electrode main body 13a2 as the second layer. Much occurrence of IR deterioration was present in the sample of sample number 19 having no metal powder added.

From the result described above, it was confirmed that, since hydrogen generated in the plating step is absorbed by hydrogen-holding film 13f also in multilayer ceramic capacitor 1B including the configuration shown in FIG. 5, diffusion of hydrogen to dielectric layer 10 through internal electrode 12 is suppressed and prevented, thereby suppressing the deterioration of IR.

It should be noted that, in the case of this third embodiment, it is preferable that hydrogen-holding film 13f is a continuous film. However, it is not always necessary to be formed as a continuous film, and it may be present partially along the surface of external electrode main body 13a1 or may be present in a meshed form, a linear form, or the like. Moreover, the film is not always necessary to have an even thickness, and it may be formed such that there is a difference in distribution of hydrogen-holding metal in the thickness direction.

Fourth Embodiment

Figure 6:
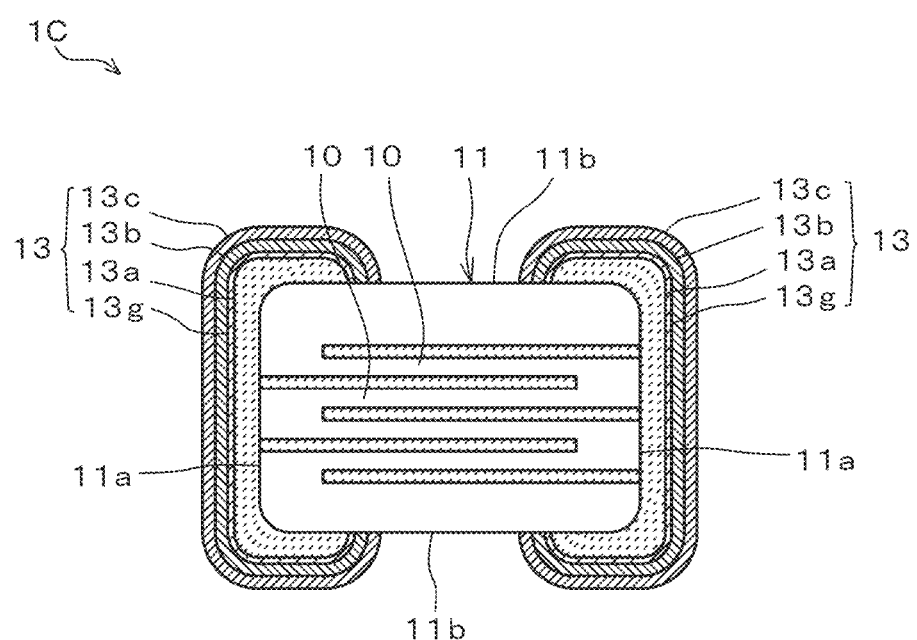
FIG. 6 is a cross-sectional view representing a multilayer ceramic capacitor in accordance with a fourth embodiment of the present invention.

FIG. 6 represents a multilayer ceramic capacitor 1C in accordance with a fourth embodiment of the present invention. In this multilayer ceramic capacitor 1C, hydrogen-holding films 13g including a hydrogen-holding element are formed between the surfaces of external electrode main bodies 13a and plating layers 13b, in other words, on the outer surfaces of external electrode main bodies 13a.

Hydrogen-holding films 13g are formed by spattering a hydrogen-holding element (hydrogen-holding metal) in a metal state, and are formed on the surfaces of external electrode main bodies 13a in a state of metal films. Moreover, hydrogen-holding films 13g are formed continuously so as cover entire surfaces of external electrode main bodies 13a. It should be noted that hydrogen-holding films 13g can be formed also by vapor deposition, plating, or the like.

<Evaluation Test>

In order to confirm the significance of multilayer ceramic capacitor 1C of this embodiment, samples including films formed by spattering different kinds of metals (Sn, Bi, Al, Ag, Pd, Ti), in other words, samples of the sample numbers 20 to 25 in Table 4 were produced. Moreover, a sample of the sample number 26 having no spattering applied and having no hydrogen-holding film formed thereon was produced. It should be noted that the specification of conductive paste for forming external electrode main bodies 13a was set to be the same as that of the second embodiment.

For the samples of the sample numbers 20 to 26 in Table 4 manufactured in such a manner, the test was conducted under the same condition as the PCBT test conducted in the above-described first embodiment.

The results are shown in Table 4.

TABLE 4

| Sample Number | Spattered Metal | IR Deterioration Number n = 20 |
|---|---|---|
| 20 | Sn | 0 |
| 21 | Bi | 0 |
| 22 | Al | 0 |
| 23 | Ag | 4 |
| *24 | Pd | 9 |
| *25 | Ti | 10 |
| *26 | none | 7 |

The samples having * on the sample numbers are samples which are out of the scope of the present invention.

In Table 4, the samples of the sample numbers 20 to 23 are samples satisfying the requirements of the present invention, and the samples of the sample numbers 24 to 26 are samples not satisfying the requirements of the present invention.

As shown in Table 4, occurrence of the IR deterioration could not be confirmed in the sample of the sample number 20 provided with an Sn film as hydrogen-holding film 13g, the sample of the sample number 21 provided with a Bi film as hydrogen-holding film 13g, and the sample of the sample number 22 provided with an Al film as hydrogen-holding film 13g. Moreover, there was a few occurrence of IR deterioration in the sample of sample number 23 provided with an Ag film as hydrogen-holding film 13g.

On the other hand, much occurrence of IR deterioration could be confirmed in the sample of the sample number 24 having a Pd film formed thereon by spattering and in the sample of the sample number 25 having a Ti film formed thereon. Moreover, much IR deterioration could be confirmed also in the sample of the sample number 26 having no spattering applied.

It should be noted that, also in the case of this multilayer ceramic capacitor 1C, hydrogen-holding films 13g may be present partially or in a meshed form, a linear form, or the like between the surfaces of external electrode main bodies 13a and plating layer 13b. The significant effect can be obtained also in such case.

Fifth Embodiment

Figure 7:
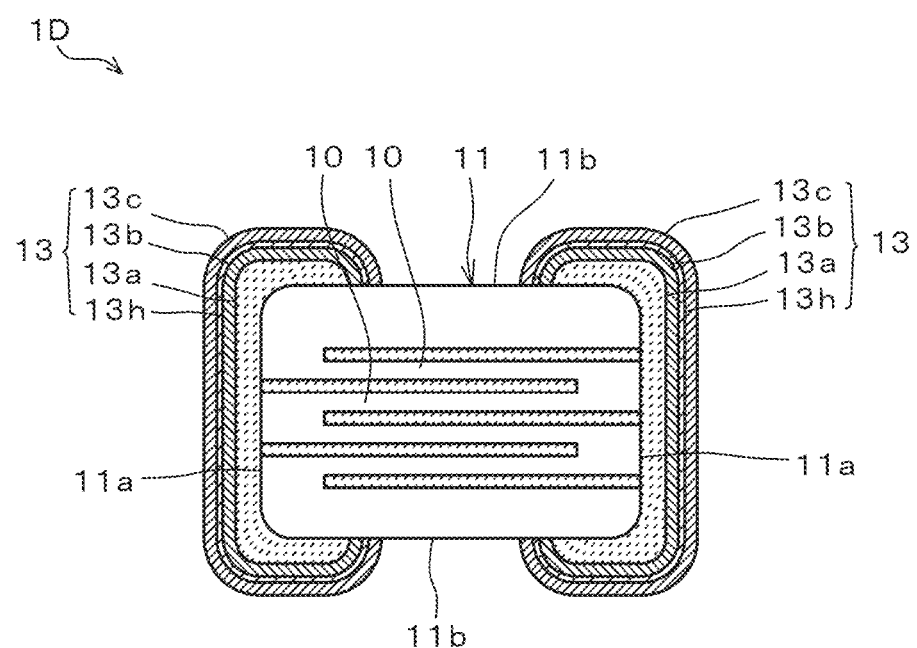
FIG. 7 is a cross-sectional view representing a multilayer ceramic capacitor in accordance with a fifth embodiment of the present invention.

FIG. 7 represents a multilayer ceramic capacitor 1D in accordance with a fifth embodiment of the present invention. In this multilayer ceramic capacitor 1D, hydrogen-holding films 13h including a hydrogen-holding element are formed between outermost plating layers 13c and inner sides of plating layers 13b.

Hydrogen-holding films 13h are formed by spattering a hydrogen holding metal in a metal state (hydrogen-holding metal) and are formed in a state of a metal film on the outer surfaces of plating layers 13b. Moreover, hydrogen-holding films 13h are formed continuously so as to cover entire surfaces of plating layers 13b. It should be noted that hydrogen-holding films 13h can be formed also by vapor deposition, plating, or the like.

<Evaluation Test>

In order to confirm the significance of multilayer ceramic capacitor 1D of this embodiment, samples including films formed by spattering different kinds of metals (Sn, Bi, Ag, Pd), in other words, samples of the sample numbers 27 to 30 in Table 5 were manufactured. Moreover, a sample of the sample number 31 having no spattering applied and having no hydrogen-holding film was produced. It should be noted that the specification of conductive paste for forming external electrode main bodies 13a was set to be the same as the one of the second embodiment.

For the samples of the sample numbers 27 to 31 in Table 5 produced in such a manner, the test was conducted under the same condition as the PCBT test conducted in the above-described first embodiment.

The results are shown in Table 5.

TABLE 5

| Sample Number | Spattered Metal | IR Deterioration Number n = 20 |
|---|---|---|
| 27 | Sn | 1 |
| 28 | Bi | 2 |
| 29 | Ag | 5 |
| *30 | Pd | 9 |
| *31 | none | 6 |

The samples having * on the sample numbers are samples which are out of the scope of the present invention.

In Table 5, the samples of the sample numbers 27 to 29 are samples satisfying the requirements of the present invention, and the samples of the sample numbers 30 and 31 are samples not satisfying the requirements of the present invention.

As shown in Table 5, there was a few occurrence of IR deterioration in the sample of the sample number 27 provided with an Sn film as hydrogen-holding film 13h, the sample of the sample number 28 provided with a Bi film as hydrogen-holding film 13h, and the sample of the sample number 29 provided with an Ag film as hydrogen-holding film 13h.

On the other hand, much occurrence of IR deterioration could be confirmed in the sample of the sample number 30 having a Pd film formed thereon by spattering. Moreover, much occurrence of IR deterioration could be confirmed in the sample of sample number 31 having no spattering applied.

It should be noted that, also in the case of this multilayer ceramic capacitor 1D, hydrogen-holding film 13h may be present partially or in a meshed form, a linear form, or the like between plating layer 13b and plating layer 13c. The significant effect can be obtained also in such case.

The distinctive configurations of the multilayer ceramic capacitors in accordance with the first to fifth embodiments illustrated above can be combined with each other as needed.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A multilayer ceramic capacitor, comprising:
    a ceramic element body including a plurality of layered dielectric layers and having opposite end surfaces opposing each other and a plurality of side surfaces connecting said opposite end surfaces;
    a plurality of internal electrodes containing a base metal as a main component, the plurality of internal electrodes being arranged between said layered dielectric layers, and being alternately drawn out to said opposite end surfaces;
    a pair of external electrodes each having an external electrode main body formed respectively on said opposite end surfaces of said ceramic element body and conductively connected to said internal electrodes drawn out to said opposite end surfaces of said ceramic element body;
    at least one plating layer on an outer side of said external electrode main body; and
    between an outermost plating layer among said at least one plating layer and said dielectric layers, at least one kind of element selected from a first element that forms a covalent hydride with hydrogen having a boiling point of 125° C. or more and a second element that forms a hydride in a boundary region with hydrogen.

2. The multilayer ceramic capacitor according to claim 1, wherein said external electrode main body contains said at least one kind of element.

3. The multilayer ceramic capacitor according to claim 2, wherein said internal electrode contains said at least one kind of element.

4. The multilayer ceramic capacitor according to claim 1, wherein said internal electrode contains said at least one kind of element.

5. The multilayer ceramic capacitor according to claim 1, wherein said at least one kind of element is at least one selected from the group consisting of Sn, Bi, Al, Ag, Zn, Au, In, Ga, Ge, and Si.

6. A multilayer ceramic capacitor, comprising:
    a ceramic element body including a plurality of layered dielectric layers and having opposite end surfaces opposing each other and a plurality of side surfaces connecting said opposite end surfaces;
    a plurality of internal electrodes containing base metal as a main component, the plurality of internal electrodes being arranged between said layered dielectric layers, and being alternately drawn out to said opposite end surfaces; and
    a pair of external electrodes each having an external electrode main body formed respectively on said opposite end surfaces of said ceramic element body and conductively connected to said internal electrodes drawn out to said opposite end surfaces of said ceramic element body;
    at least one plating layer on an outer side of said external electrode main body; and
    a hydrogen-holding film between an outermost plating layer among said at least one plating layer and said dielectric layers, said hydrogen-holding film containing at least one kind of element selected from a first element that forms a covalent hydride with hydrogen having a boiling point of 125° C. or more and a second element that forms a hydride in a boundary region with hydrogen.

7. The multilayer ceramic capacitor according to claim 6, wherein said hydrogen-holding film is at an interface between said internal electrode and said external electrode main body.

8. The multilayer ceramic capacitor according to claim 7, wherein said at least one kind of element is at least one selected from the group consisting of Sn, Bi, Al, Ag, Zn, Au, In, Ga, Ge, and Si.

9. The multilayer ceramic capacitor according to claim 6, wherein said hydrogen-holding film is on an outer surface of said external electrode main body.

10. The multilayer ceramic capacitor according to claim 9, wherein said at least one kind of element is at least one selected from the group consisting of Sn, Bi, Al, Ag, Zn, Au, In, Ga, Ge, and Si.

11. The multilayer ceramic capacitor according to claim 6, wherein said hydrogen-holding film is in said external electrode main body.

12. The multilayer ceramic capacitor according to claim 11, wherein said at least one kind of element is at least one selected from the group consisting of Sn, Bi, Al, Ag, Zn, Au, In, Ga, Ge, and Si.

13. The multilayer ceramic capacitor according to claim 6, wherein said hydrogen-holding film is at an interface between said internal electrode and said dielectric layer.

14. The multilayer ceramic capacitor according to claim 13, wherein said at least one kind of element is at least one selected from the group consisting of Sn, Bi, Al, Ag, Zn, Au, In, Ga, Ge, and Si.

15. The multilayer ceramic capacitor according to claim 6, wherein said at least one plating layer includes a plurality of plating layers, and said hydrogen-holding film is at an interface between an outermost plating layer and an innermost plating layer of said plurality of plating layers.

16. The multilayer ceramic capacitor according to claim 15, wherein said at least one kind of element is at least one selected from the group consisting of Sn, Bi, Al, Ag, Zn, Au, In, Ga, Ge, and Si.

17. The multilayer ceramic capacitor according to claim 6, wherein said at least one kind of element is at least one selected from the group consisting of Sn, Bi, Al, Ag, Zn, Au, In, Ga, Ge, and Si.

* * * * *